S. V. DAY.
PNEUMATIC CALLIOPE.
APPLICATION FILED AUG. 31, 1907.

908,968.

Patented Jan. 5, 1909.

3 SHEETS—SHEET 2.

Witnesses
F. L. Ourand
Watts T. Estabrook

Inventor
Samuel V. Day
By Louis Bagger & Co
his Attorneys

S. V. DAY.
PNEUMATIC CALLIOPE.
APPLICATION FILED AUG. 31, 1907.
908,968.
Patented Jan. 5, 1909.
3 SHEETS—SHEET 3.
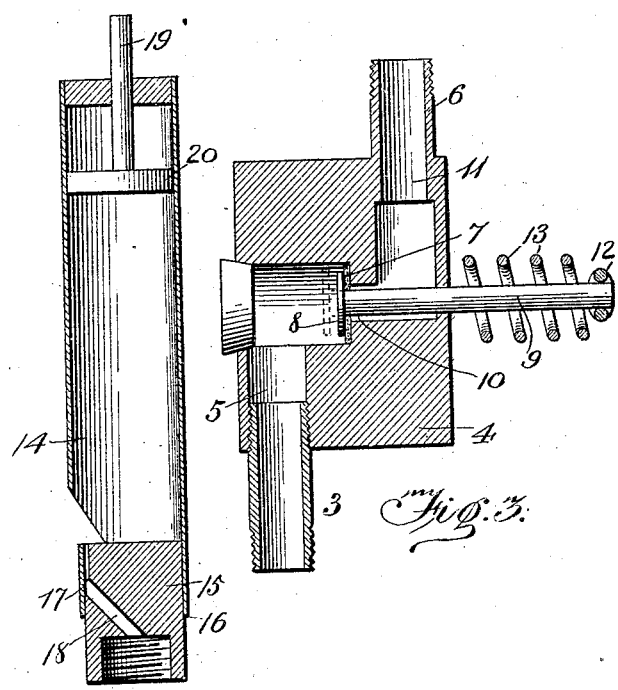
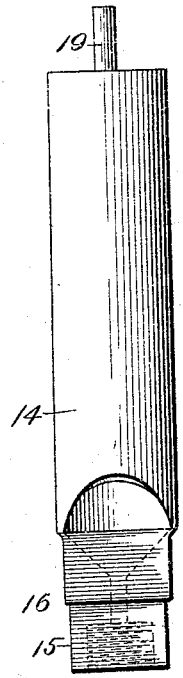
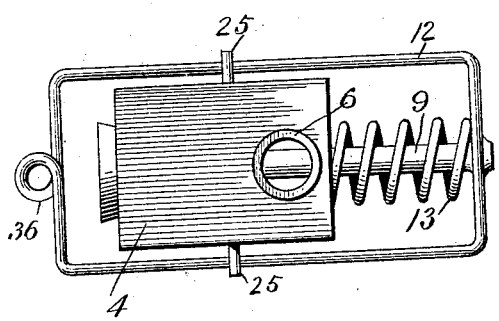
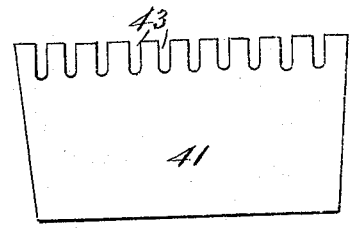

UNITED STATES PATENT OFFICE.

SAMUEL V. DAY, OF WICHITA, KANSAS.

PNEUMATIC CALLIOPE.

No. 908,968.   Specification of Letters Patent.   Patented Jan. 5, 1909.

Application filed August 31, 1907. Serial No. 390,922.

*To all whom it may concern:*

Be it known that I, SAMUEL V. DAY, a citizen of the United States, residing at Wichita, in the county of Sedgwick and State of Kansas, have invented certain new and useful Improvements in Pneumatic Calliopes, of which the following is a specification.

My invention relates to an improvement in pneumatic calliopes, and the object is to operate the whistles, by a key-board, which when operated permits the air to enter the whistle and causes it to sound.

A further object is to do away with the use of a steam boiler, and to provide a calliope which will be cheap to manufacture and a small cost to operate.

The invention relates to certain other novel features of construction and combinations of parts which will be hereinafter described and pointed out in the claims.

Figure 1:
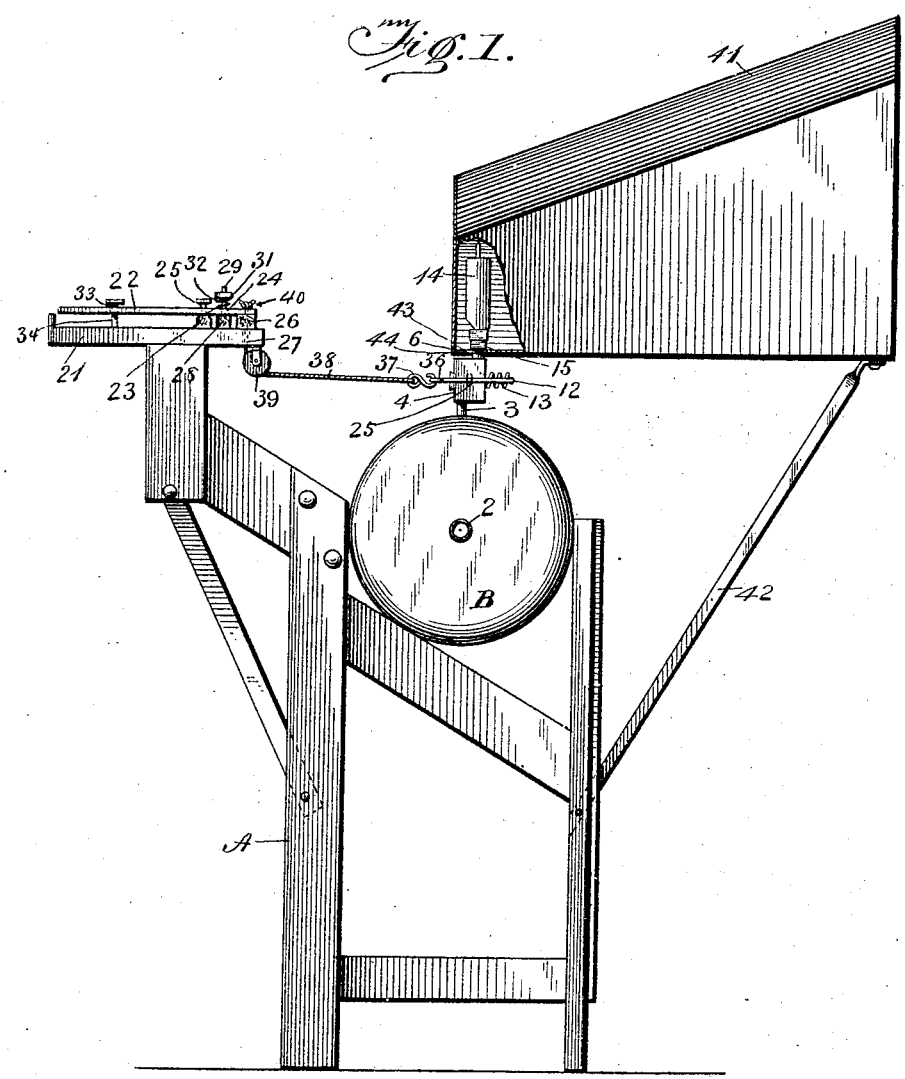
Figure 2:
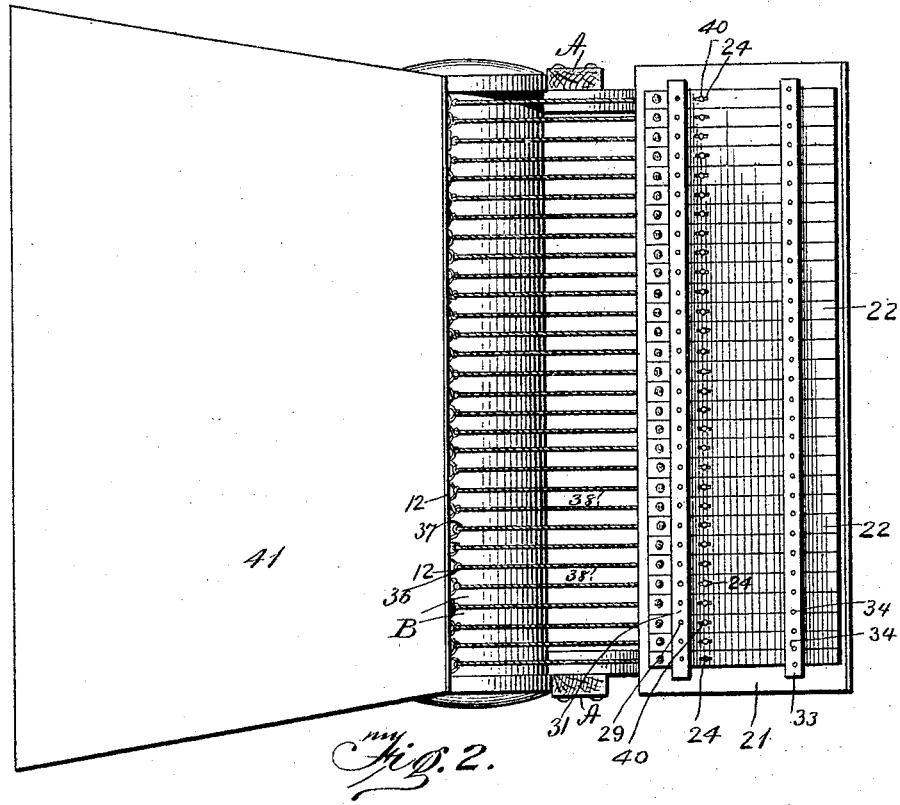
Figure 5:
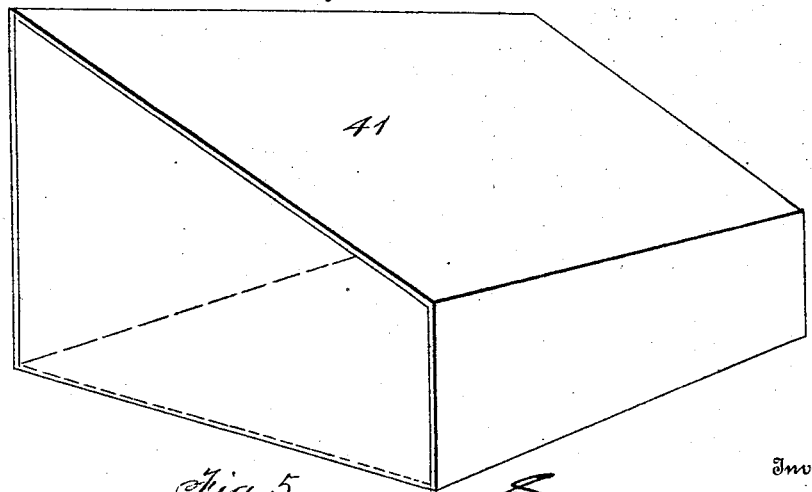

In the accompanying drawing, Figure 1 is a view in side elevation, Fig. 2 is a top plan view, Fig. 3 is a sectional view of the valve thereof, Fig. 4 is a plan view thereof, Fig. 5 is a perspective view of the megaphone, Figs. 6 and 7 are views of the whistle, and Fig. 8 is a detail.

A, represents the frame-work, and B the compressed air tank which is supported thereon, to which a supply pipe 2 is connected for conveying the air to the tank from any suitable source of supply.

Connected to the tank B are a series of tubes 3, which are connected to the conduit 5 of the valve casing 4. An offset portion is formed off from the conduit 5 forming a valve-seat 7 for the valve 8 on the valve-stem 9, which passes through the opening 10 leading to the conduit 11, and then through the valve casing where it is connected to a yoke 12 surrounding the valve, and between the valve casing and yoke, and encircling the valve-stem 9 is a coil spring 13 which holds the valve on the seat 7. Another tube 6 connects the conduit 11 to the plug 15 of the whistle 14. The whistle 14 is cylindrical in shape, but is squared at the bottom as at 16 to conform to the shape of the plug 15, through which plug a small hole 17 is formed leading to the spreader 18. The top of the whistle is closed, but the stem 19 of the plunger 20 extends therethrough, and the plunger is adapted to reciprocate within the whistle to vary the tone.

On the frame A, is mounted a key-board 21, having keys 22, 22, fulcrumed on the bar 23. The keys are provided with openings 24 through which pins 25 pass, for holding the key in place. A key-stop 26 on the key-board having holes 27, 27 formed therein which extend down through the key-board, and between the fulcrum and the key-stop a bar 28 is secured to the key-board 21 having pins 29, 29 extending upward through the keys 22, and through the cross bar 31 which is secured to the bar 28. Between the bar 31 and the keys 22, and encircling the pins 29 are coil springs 32 for causing the keys to return to their normal position after the operator has pressed one or more of them down. At the forward end another bar 33, is connected to the key-board 21 by means of pins 34 passing through the keys 22 to assist in holding the keys in proper position.

The yoke 12 which encircles the valve casing 4 passes through guides 25, 25 and a ring 36 is formed therein for the hook 37 of the rope or wire 38, which rope or wire passes over a pulley 39 and up through the hole 27 in the key-board and key-stop where it is secured to the pegs 40, 40 on the keys 22, whereby the whistle is caused to sound as the operator presses the key down, drawing the rope or wire 38 up over the pulley 39 and unseating the valve 8 and permitting the air to enter the whistle. A megaphone 41 is placed over the whistles 14, and extends outwardly from the frame A, and is supported by braces 42, 42 connected to the frame. The base of the megaphone is slotted at one edge 43, through which slots the tubes extend. The megaphone enlarges from the whistles in all directions except the bottom portion, and one end 44 is removable, so that another end can be put in having slots which the tubes 6 can pass through, thereby allowing the megaphone to be used in a vertical position.

The operation of the calliope can be understood from the foregoing description, but to briefly recapitulate; a whistle is caused to sound, by the operator pressing a key 22, which causes the opposite end to rise drawing the rope or wire 38 which is connected to the yoke 12, unseating the valve 12, which permits the air from the tank to pass through the valve casing 4 up to the whistle causing it to sound, and the plunger in whistle adapted to reciprocate therein to give the tone.

It is evident that many slight changes might be made in the form and arrangement of the several parts described without departing from the spirit and scope of my invention, and hence I do not wish to limit myself to the exact construction herein set forth; but:—

Having fully described my invention what I claim as new and desire to secure by Letters Patent, is:—

1. A pneumatic calliope comprising an air tank, valve casings connected to the tank having valves therein, whistles connected to the valve casings, a key board, keys thereon, yokes connected to the valves and surrounding the valve casings and passing through guides on the valve casings, and rods or wires connected to the yokes and keys whereby the whistles are sounded when the keys are operated.

2. A pneumatic calliope comprising an air tank, valve casings connected to the tank, whistles connected to the valve casings, said valve casings having conduits and valves for closing the conduits, rods encircling the valve casings and engaging the valves, a key board, keys thereon, means connecting the keys and rods, and means engaging the keys to cause them to return to their normal position.

3. A calliope comprising a tank, whistles, valves connected to the tank and whistles, yokes connected to the valves, a megaphone inclosing the whistles, and the base of the megaphone having slots formed at one edge through which the whistles extend.

In testimony whereof I affix my signature in presence of two witnesses.

SAMUEL V. DAY.

Witnesses:
ADA SPENCER,
NORMAN H. BEEBE.